(12) United States Patent
Alcov

(10) Patent No.: US 8,230,950 B2
(45) Date of Patent: Jul. 31, 2012

(54) MULTI-PURPOSE SCOOP

(76) Inventor: Nicholas Alcov, Arroyo Grande, CA (US)

( * ) Notice: Subject to any disclaimer, the term of this patent is extended or adjusted under 35 U.S.C. 154(b) by 0 days.

(21) Appl. No.: 12/807,711

(22) Filed: Sep. 13, 2010

(65) Prior Publication Data

US 2011/0163559 A1 Jul. 7, 2011

(51) Int. Cl.
E21B 25/00 (2006.01)
(52) U.S. Cl. ......... 175/244; 175/403; 175/20; 294/50.7; 172/22; 7/114
(58) Field of Classification Search ............ 175/321, 175/244, 403, 20, 58; 294/50.7; 172/22; 7/114
See application file for complete search history.

(56) References Cited

U.S. PATENT DOCUMENTS

| | | | |
|---|---|---|---|
| 370,810 A | 10/1887 | Newman | |
| 588,833 A * | 8/1897 | Overbey | 294/50.5 |
| 1,067,363 A * | 7/1913 | Minter | 175/212 |
| 1,293,351 A | 2/1919 | Creasy | |
| 1,456,153 A | 5/1923 | Seeger | |
| 2,571,244 A | 10/1951 | Hollander | |
| 2,802,689 A * | 8/1957 | Batstone | 294/50.7 |
| 3,089,721 A * | 5/1963 | Puckett | 294/50.7 |
| 3,123,391 A * | 3/1964 | Novak | 294/50.7 |
| 3,162,256 A | 12/1964 | Meinecke | |
| 3,291,231 A * | 12/1966 | Kammer | 175/170 |
| 3,444,938 A * | 5/1969 | Ballmann | 111/101 |
| 4,244,614 A | 1/1981 | Madsen | |
| 4,676,538 A | 6/1987 | Fiedler | |
| 4,788,894 A | 12/1988 | Mitschele | |
| 4,819,735 A * | 4/1989 | Puckett | 172/72 |
| 4,884,638 A * | 12/1989 | Hoffman | 172/22 |
| 5,338,078 A * | 8/1994 | Basek | 294/50.5 |
| 5,492,181 A * | 2/1996 | Grant | 172/22 |
| 6,123,374 A * | 9/2000 | Elder | 294/50 |
| 6,439,629 B1 | 8/2002 | Bieth | |
| 6,662,879 B1 * | 12/2003 | Costa | 172/22 |
| 7,070,006 B2 | 7/2006 | Villani | |

* cited by examiner

*Primary Examiner* — Nicole Coy
(74) *Attorney, Agent, or Firm* — Trenner Law Firm, LLC; Mark D. Trenner

(57) ABSTRACT

A multi-purpose scoop consisting of a body attached to a handle. A neck may be positioned between the body and handle. On the handle is a vent which is covered to permit suction. Passing through the center of the handle and down into the body is a rod. At the bottom of the rod is a means of pushing out any substrate. At the top of the rod is a means to rotate the rod. Also positioned within the handle and body are means to center and stabilize the rod, but still allow the rod to move. A means for keeping the rod out of the way after use is provided. The rod has a locking means for maintaining the rod in the downward position. The body also has a plurality of teeth to assist in cutting. The teeth are positioned along an opening which provides the use of the tool as a scoop. The width, shape and spacing of the teeth provide additional usage for raking and weed pulling.

19 Claims, 18 Drawing Sheets

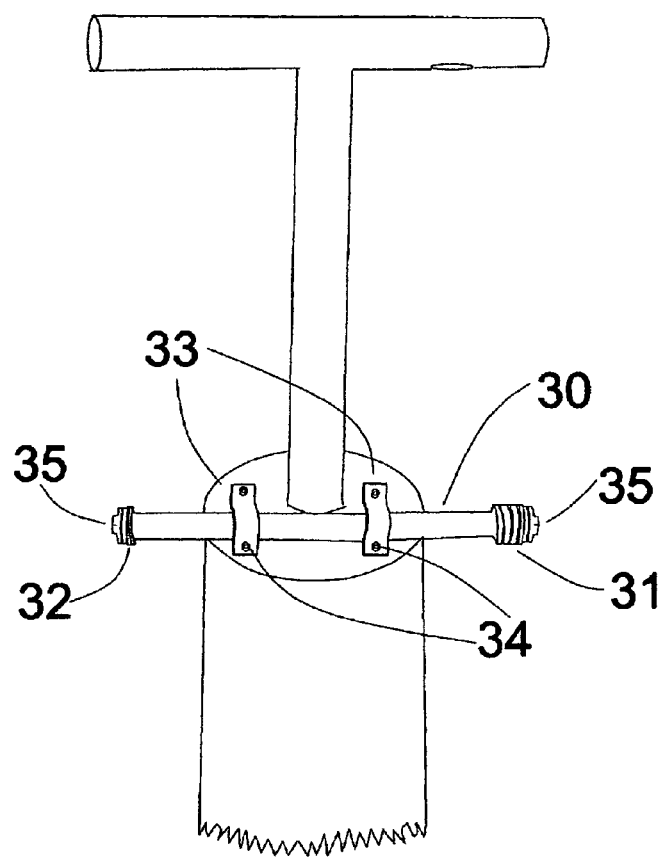

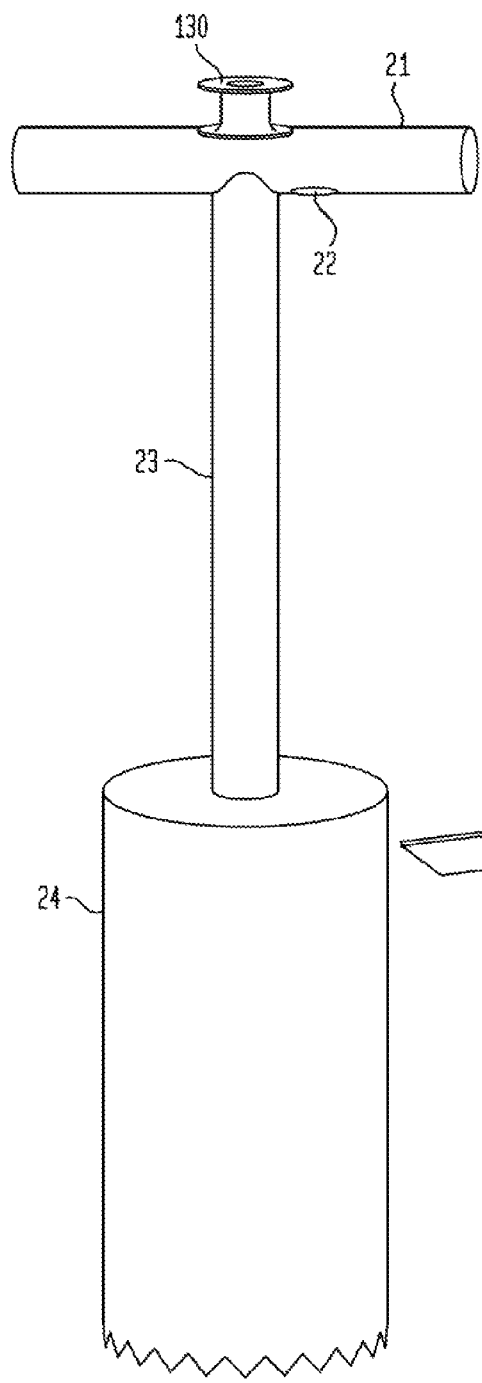
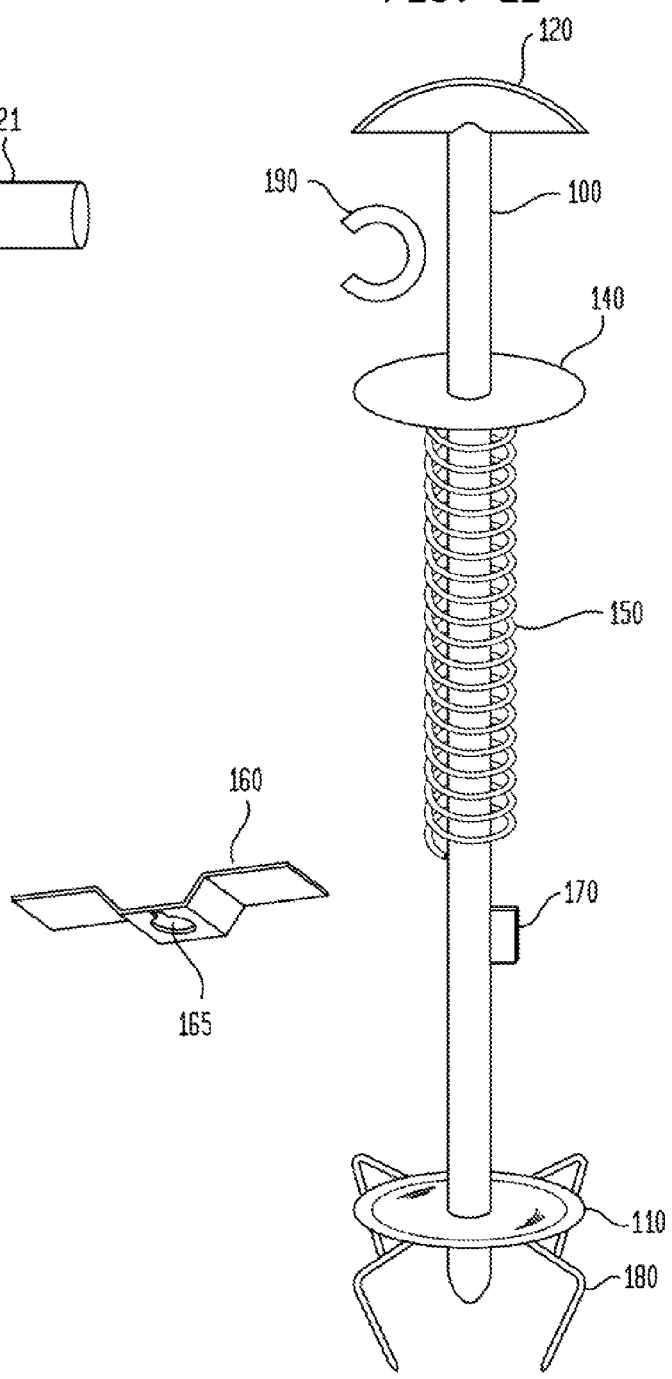

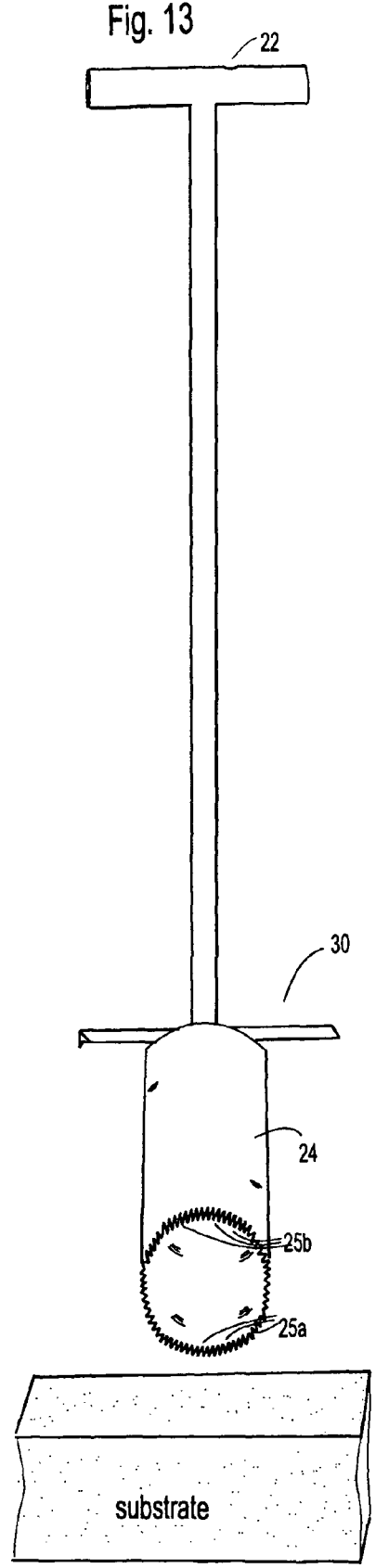

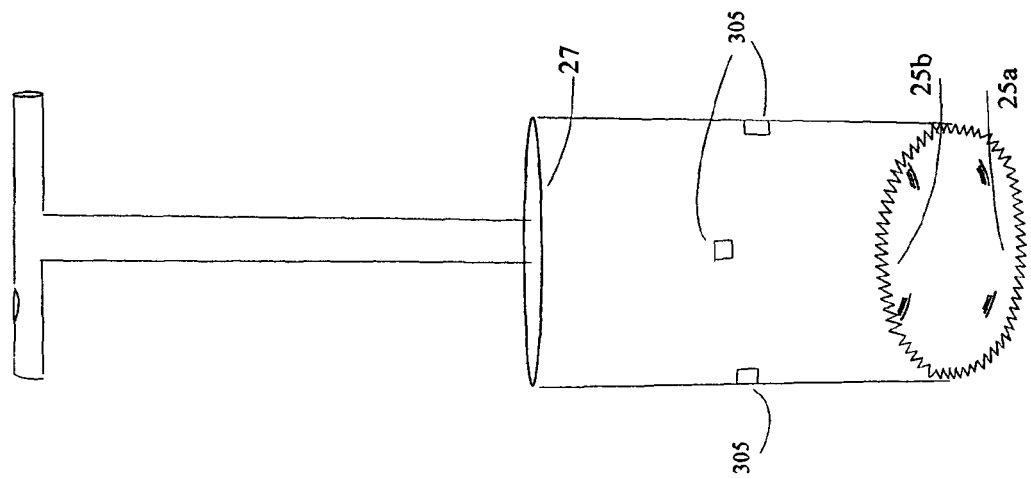
FIG 17
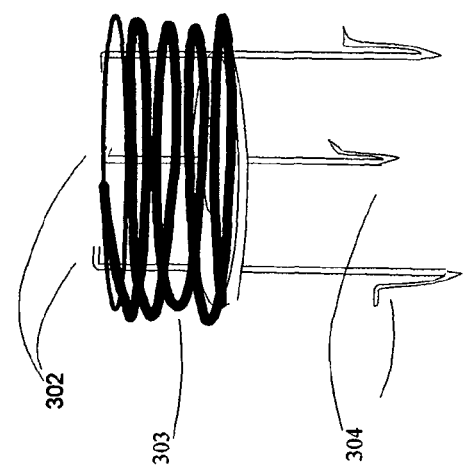
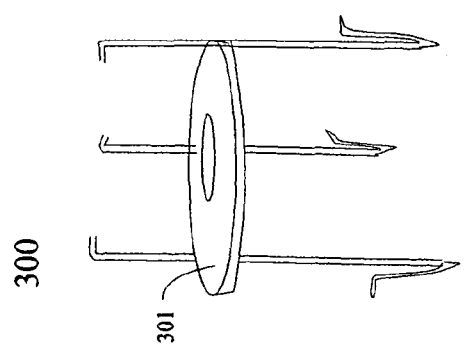

MULTI-PURPOSE SCOOP

TECHNICAL FIELD

The present invention generally relates to a garden tool for digging, and more particularly, to a garden tool used in the creation of holes with a minimal disturbance to the surrounding area with the additional uses to scoop and rake.

BACKGROUND

In the past, shovels have been utilized for digging holes. Although there are different sizes of shovels, the lever action upon which the shovels rely increases disturbance of the area and makes replacement of the surrounding media a broken mix of what was there beforehand. Frequently, the importance of maintaining the appearance of the area is as important as the reason for creating the hole, for example, a manicured lawn. A shovel may damage a utility or sprinkler line or be damaged by an over grown sprinkler. Post hole diggers use a pinching action which also increases disturbance of the area and would break a sprinkler. A shovel would present a problem of neatly deposit soil or fertilizer into a small opening or of carrying the soil or fertilizer across a distance without spilling the contents. The additional ability provided by a rake is also a missing benefit not found in previous tools.

There are improvements on shovels and post hole diggers discussed in the prior art. For example, there is a shovel with wings, but the lever action of this shovel would still break or pull up a sprinkler and disturbs the lawn. There is also an improvement on a post hole digger that minimizes the physical effort involved, but it still uses the pinching jaws that would damage a sprinkler head and/or mixes the lawn with the soil, thus harming the appearance of the lawn. Improvements on scoops are also shown but lack the above mentioned benefits.

None of the devices of the prior art individually or in combination teach a system that enables one to remove a plug of lawn and soil using suction while creating a hole with a minimal disruption to the surrounding area. Nor do the devices of prior art allow one to remove the soil from around a sprinkler head or other protuberance without damage to the sprinkler or protuberance with ability to scoop and neatly contain the contents. The use of the tool as a rake along with the mentioned benefits are not found in prior art.

Accordingly, there is a need for a tool to assist gardeners and repairmen in creating a hole and repairing the underground utility or sprinkler lines with a minimal amount of damage to the surrounding area with the ability to scoop and neatly deposit needed material while providing the rake like benefits.

SUMMARY

In view of the foregoing disadvantages in the prior art, the present invention provides a tool to make a hole which saves a plug which can be replaced if desired. The tool creates this hole with a minimal amount of disruption to the appearance of the area. In addition, the tool can remove this plug from around a sprinkler or other protuberance without damage to the sprinkler or other protuberance. The tool has the added advantage of use as a scoop for holding contents which can be neatly deposited into smaller openings than traditional shovels.

In one embodiment, the present invention provides a tool consisting of a hollow body attached to a handle. A neck may be positioned between the body and handle to bring the handle to a comfortable height. On the handle is an opening or vent which may be covered with a portion of the hand such as a finger. Alternatively, the opening may be covered by a seal or grommet. By applying downward pressure and rotating the handle, a boring action is created. By keeping the vent covered while pulling upward on the handle, suction is created and a plug is removed from the ground. Generally, this plug can be replaced if desired thus maintaining a neat appearance to the area.

In another embodiment of the present invention, the body will have a plurality of serrated teeth to assist in cutting through the substrate, roots, and/or other obstructions contained in the medium in which the tool is being utilized.

In another embodiment of the present invention, the serrated teeth are connected to the body in a manner such that they can be replaced when worn, broken or teeth with other characteristics are desired.

In another embodiment of the present invention, the serrated teeth are positioned along the opening of the hollow body at levels such that teeth located lower on the opening of the hollow body will have contact with the soil prior to teeth further up the opening. The opening can be oriented such that the teeth are at tiered locations and such that sides to the opening are created. These variations in the opening allow the tool to be utilized as a scoop. Variation to the width and distance between teeth can create a rake like teeth.

In another embodiment of the present invention a rod passes through the center of the handle and down into the body. At the bottom of the rod is a means of pushing out any substrate, such as soil which may be adhering to the inside of the body. Embodiments of this pushing means include plates, tines, and/or screws. At the top of the rod is a means to rotate the rod, such as a handle or a knob.

The seal and/or grommet that covers the opening on the handle also allows the rod to travel up and down within the handle and seals the opening at the handle through which the rod travels thus maintaining suction when the vent hole is covered. The seal may be made from rubber, plastic, and/or any other suitable material.

Also positioned within the handle and body are means to center and stabilize the rod, but still allow the rod to move up and down. Embodiments of this stabilizing means include hex nuts and/or slotted plates. The stabilizing means is attached to the inside of the handle and body by an adhesive, such as welding glue. The stabilizing means is attached such that it still allows for the passage of air up through the handle to the vent hole and does not impede the suction required to make the present invention function.

A means for bringing the rod back up and keeping it out of the way after use is provided. One embodiment of such a means is a spring that applies upward pressure on the rod. The tension created by the spring is such that the upward pressure also permits the rod to be pushed downward to serve as a plunger when required.

In another embodiment of the present invention, the rod has a locking means of maintaining the rod in the downward position so that the tines or other additional devices may function when required. An example of this locking means is a bracket with a key hole opening the allows a tab positioned on the rod to pass through the opening. By rotating the handle or knob at the top of the rod, the tab on the rod is rotated allowing the tab to lock into the key hole bracket keeping the rod from moving upward until required. Additionally, the locking means keeps the rod from rotating so that the tines may cultivate the substrate. Alternatively, the locking means may be a C-clip.

In another aspect of the present invention the attachment at the end of the rod allows the removal and interchange of other tools such as a mixing end or a cutting end; thus providing various uses for the hole making tool of the present invention.

In another aspect of the present invention a seal located on the rod assembly which is in contact with the inner diameter of the tool creates additional suction when the vent is covered and the rod is pulled upward. Similarly, allowing air in through the vent, then covering the vent while pushing down on the rod will provide pressure to expel contents.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

These and other features, aspects, and advantages of the present invention will be become better understood with regard to the following description, appended claims, and accompanying drawings where:

FIG. 3A is a perspective view of the hole making tool illustrating a removable foot bar with screw on connectors and plugs according to one embodiment of the present invention.

FIG. 11 is an internal view of the handle, illustrating the rod for moving substrate, spring means for moving the rod, rod locking means, and tines for cultivating the substrate.

FIG. 12 is a perspective view of the hole making tool illustrating the handle, body, and teeth according to another embodiment of the present invention.

FIG. 13 is a perspective view of the hole making tool illustrating the handle, opening in the body which creates a longer and shorter side and upper and lower teeth.

FIG. 17 is a perspective view of components in a multi-purpose scoop illustrating a foot pedal operated spring plunger system.

DETAILED DESCRIPTION OF THE INVENTION

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item. The present invention provides a tool for creating holes with a minimal amount of disruption to the surrounding area. While the examples provide uses in soil, use on other surfaces may also apply.

The present invention provides a tool which can be utilized to remove a plug of lawn and soil from around an over grown sprinkler without damage or removal of the sprinkler. The PVC pipes providing water to these sprinklers break and need repair as do other types of utility lines. With the present invention, a plug of lawn and soil can be removed from over the break. Once the repair to the line is complete, the plug can be replaced for the lawn to re-grow. This provides a neat repair without the mound of soil that is generally left if a shovel is used. The hole making tool of the present invention is ideal for planting in that it provides a neat hole and simultaneously soaks the soil as is often recommended for root growth. The present invention may also be used for digging post holes as well as to scoop, rake and pull weeds In another embodiment, portions of the hole making tool with a pressure nozzle may also be utilized as an auger for digging a trench, such as under a sidewalk for routing utility lines, as a pressure washer, and/or for other purposes.

Figure 1:
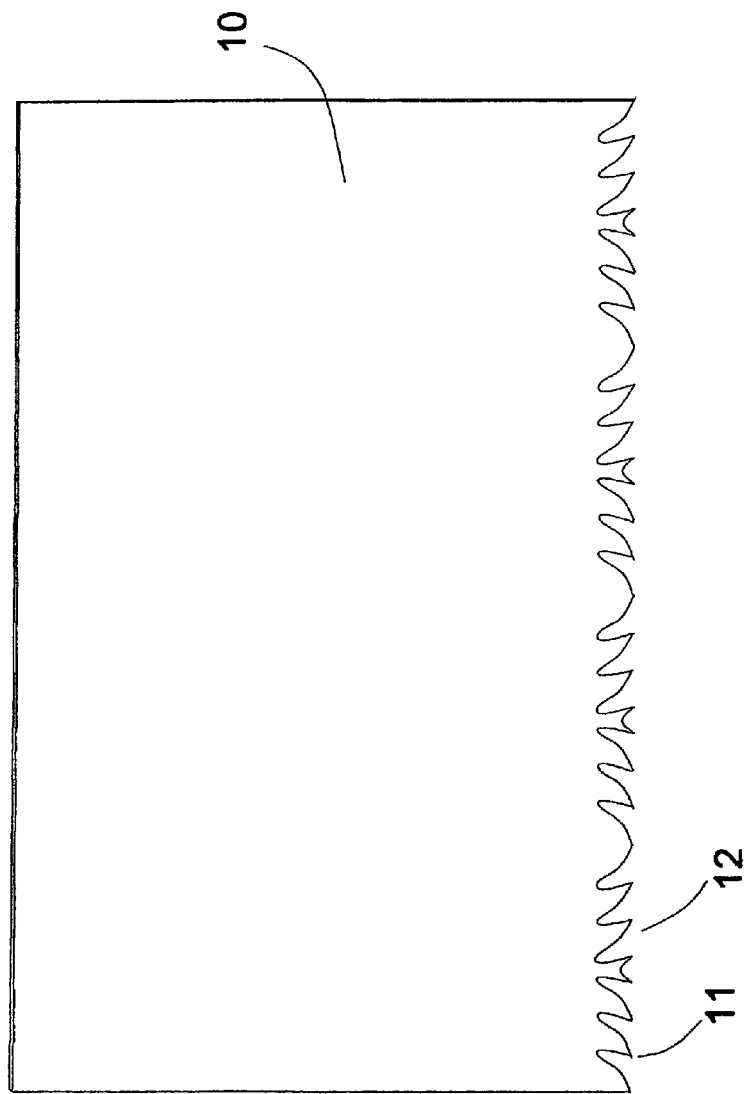
FIG. 1 is a perspective view of a sheet of material illustrating a plurality of teeth, some of which are beneficial when rotating the hole making tool in one direction, while others are beneficial when rotating the hole making tool in the other direction, according to one embodiment of the present invention.

FIG. 1 illustrates a sheet of material 10 with a plurality of teeth 11 and 12. The material may be galvanized steel, aluminum, or any other material suitable to withstand the rigors of digging and the weight applied on the tool. Sheet 10 is rolled and the ends of sheet 10 are joined by weld or other means, to create a cylindrical body. The cylindrical body may be constructed in various diameters and heights determined by the size of the hole to be made. The plurality of teeth 11 and 12 are arranged so that cutting occurs when the cylindrical body is rotated in either a clockwise or counter-clockwise direction. Other means, such as boring out a block of material, may also be utilized to create the cylindrical body.

Figure 2:
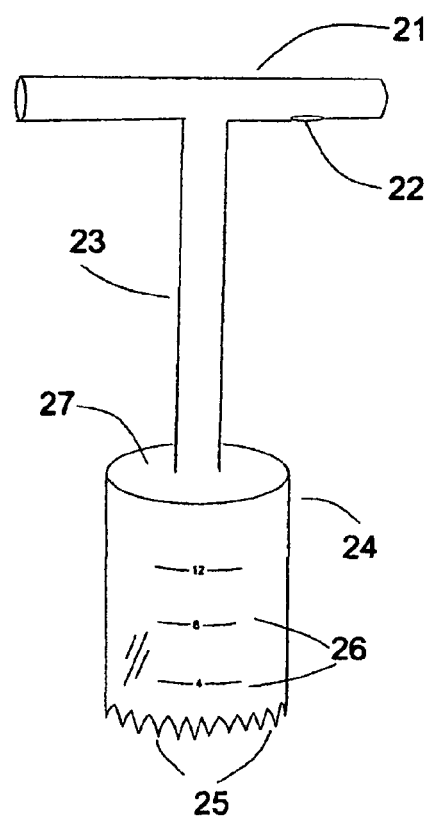
FIG. 2 is a perspective view of the hole making tool illustrating the handle, body, and teeth according to one embodiment of the present invention.

FIG. 2 illustrates the hollow cylindrical body 24 having a plurality of teeth 25 positioned at the bottom of the body. The material of which these teeth are composed, as well as the size, angle and other characteristics, is dependent upon the substrate to be bored. In one embodiment, teeth 25 will have directionality and shape such that some will provide cutting when body 24 is rotated in a clockwise direction, while others will provide cutting when body 24 is rotated in a counter-clockwise direction. A cap 27 attaches to the top of body 24 by means such as weld, screw on threads, and the like. A neck 23 attaches to an opening in cap 27 by means such as weld, screw on threads, locking tabs, and the like. A handle 21 is attached to neck 23 by means such as weld, screw on threads, locking tabs and/or the like. The ends of handle 21 are sealed by welds, threaded plugs attached to the handle ends by complimentary screw threads, or other means to seal the ends.

In one embodiment, a vent 22 is located on handle 21 in a position that can be easily covered with a finger, thumb or portion of the hand. Vent 22 may have screw on threads so that a plug with complimentary screw on threads may be inserted if desired, or alternatively, a shut off valve could be utilized for venting. Demarcations 26 indicating the depth of the hole created, are beneficial to determine the depth of the hole for planting as well as estimating how close the tool is to a utility line.

While the drawing and descriptions depict handle 21 as a tube shape, other shapes, such as a wheel, may be easier to turn. In addition, handle 21 may attach directly to body 24 without neck 23, or alternatively, on a location on neck 23 other than that shown. For example, for use as a post hole digger, the hole will be deeper than for use in planting, thus the size of body 24, neck 23 and handle 21, where and how they are positioned, and where a connector may be located for the water source will vary.

Figure 3:
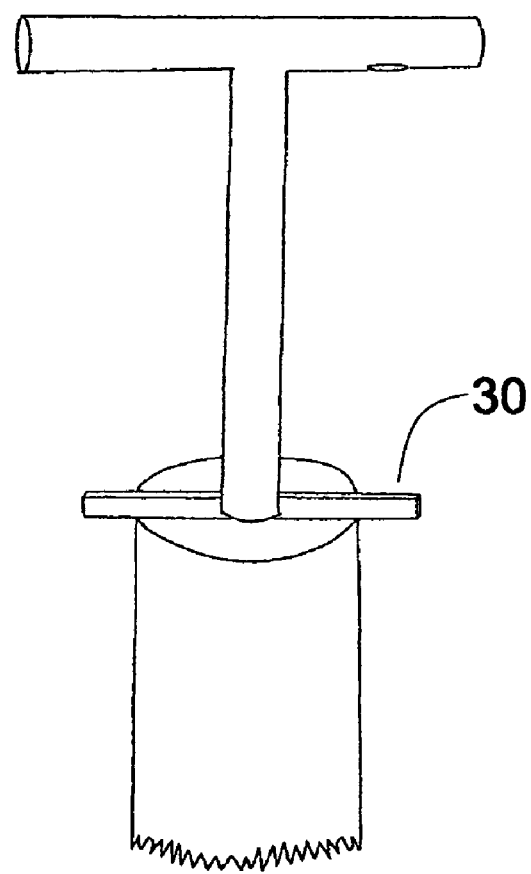
FIG. 3 is a perspective view of the hole making tool illustrating a foot bar which aids in applying downward pressure, according to one embodiment of the present invention.

In another embodiment of the present invention, a foot bar 30 as illustrated in FIGS. 3 and 3A is provided to apply downward pressure to aid in the digging process. In FIG. 3, foot bar 30 is attached permanently by weld or other suitable means. In FIG. 3A, foot bar 30 is attached by means such as straps 33 held down by bolts and nuts 34 or other means, such that foot bar 30 may be removed. Foot bar 30 may have connections such as screw on threads 31 and 32, which complement other screw on threads on other portions of the present invention, such as neck 23 and/or handle 21 to create an auger as will be detailed later. Plugs 35 with complementary attachment features may cover openings at these connections when the hole making tool is disassembled.

Figure 4:
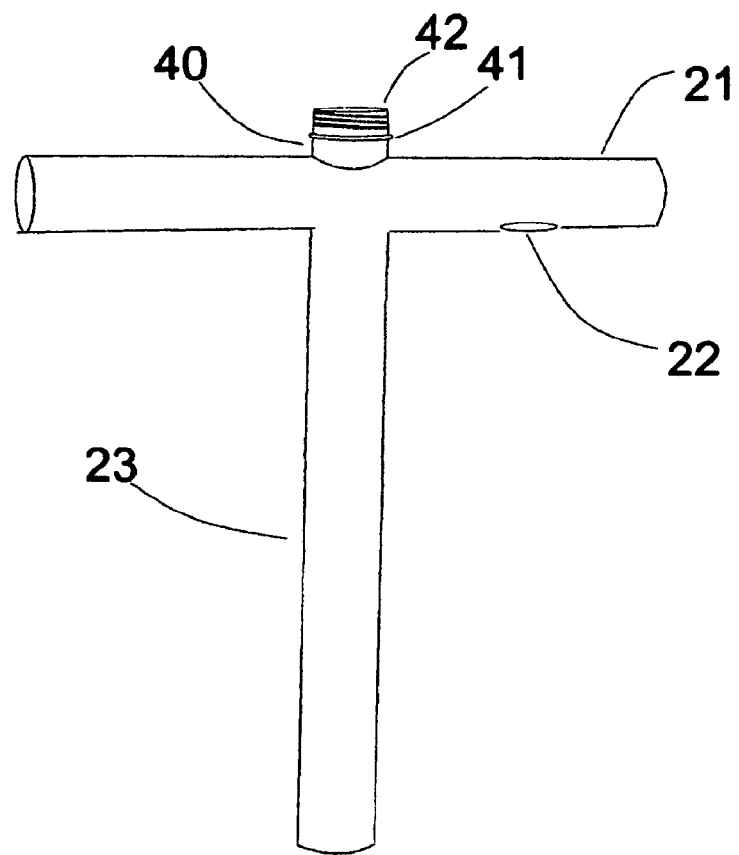
FIG. 4 is a perspective view of the side of the neck and handle, illustrating a connection to attach a means for adding an agent, such as water, according to one embodiment of the present invention.
Figure 5:
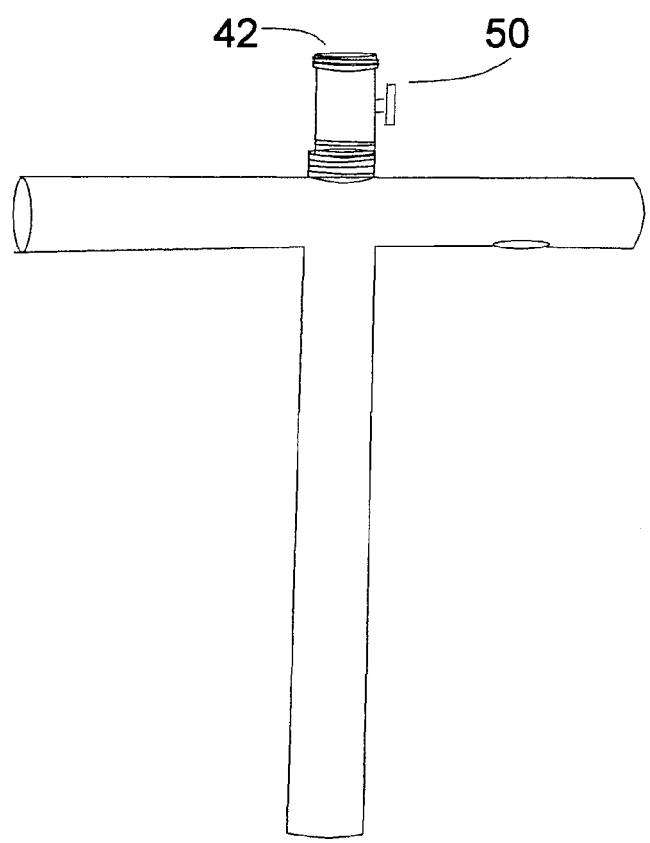
FIG. 5 is a perspective view of the side of the neck and handle, illustrating a regulating valve, according to one embodiment of the present invention.

In another embodiment of the present invention, a connection 42 is provided as illustrated in FIG. 4. Connection 42 is attached to the top of handle 21 by means of weld 40, threaded connection, locking tabs, or other means which will provide an air and water tight seal. A rotating gasket connection 41 is provided to connect a source for the addition of an agent, such as water from a garden hose, so as to not rotate the source as the handle is rotated. The agent interacts with the substrate, e.g.: a water source moistens the ground to aid in the digging process, or could enhance the performance of teeth 25, e.g.: an agent used to prevent teeth 25 from overheating. Other agents, solid, liquid, gas, and/or any combination, may be utilized based on the substrate to be bored. In another embodiment of the present invention, a shut off valve 50, as illustrated in FIG. 5, to regulate the flow of water is provided on connection 42 for the water source. Other means for regulating water flow, such as a twist type valve as seen on garden hose nozzles, or other appropriate methods may be used.

Figure 6:
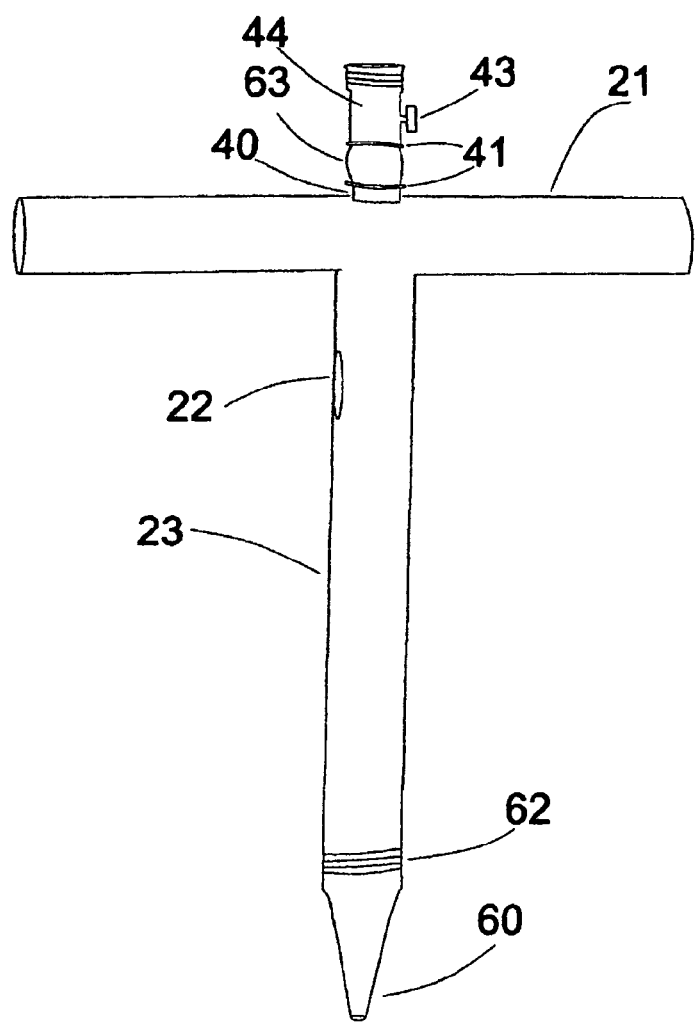
FIG. 6 is a perspective view of the side of the neck and handle, illustrating a pressure nozzle, according to one embodiment of the present invention.

In another embodiment of the present invention, a pressure nozzle 60, as illustrated in FIG. 6, may be included in the present invention. Pressure nozzle 60 may be attached at the juncture of neck 23 and body 24 (not shown), but other locations may prove beneficial, or nozzle 60 may protrude further into body 24 than shown. Neck 23 with pressure nozzle 60 may be permanently attached by weld or other means to body 24 (not shown) or neck 23 with pressure nozzle 60 may be attached to body 24 (not shown) by screw on threads 62, snap on connector, and/or other means which allows them to be disconnected from complimentary connectors located on body 24. Vent 22 is located in an ergonomic location as determined by the dimensions of the tool. A rotating knuckle 63 for the water source allows a greater degree of movement of the hose. Neck 23 with pressure nozzle 60 may be utilized as an auger to blast holes and trenches with water pressure, hose down the sidewalk, or for other purposes.

Figure 7:
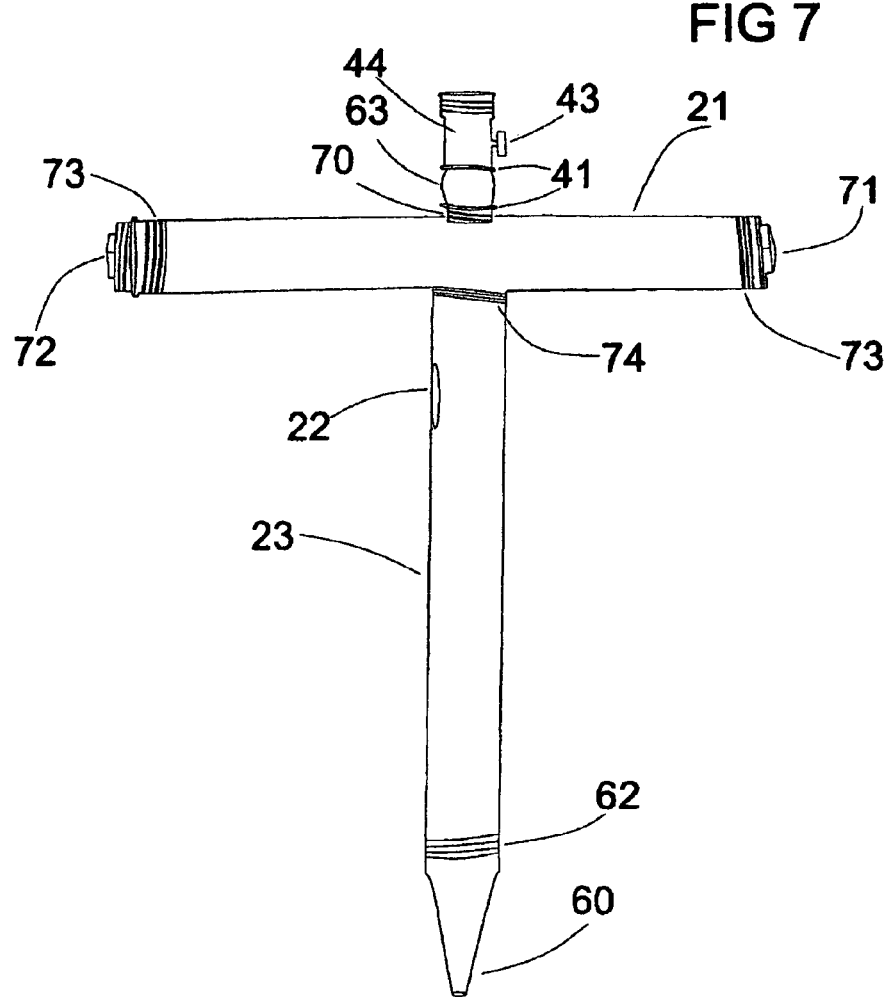
FIG. 7 is a perspective view of the side of the neck and handle, illustrating connectors and complimentary connections used to create an auger and/or pressure washer, according to one embodiment of the present invention.

In still another embodiment of the present invention, handle 21 may be unscrewed from the complementary connection 74 at neck 23, which is illustrated in FIG. 7. Handle 21 may then be connected to neck 23 by a threaded screw on connector 73 or other suitable means to create a longer auger. Plugs 71 and 72 may be removed from the complementary connections 73 and utilized to plug the openings which are created by the disassembly when the water source connector 70 is removed from the middle of handle 21 and attached at the complimentary connection 73 at the other end of handle 21. In this embodiment, vent 22 is located in a ergonomic location which provides a comfortable way of covering it with a portion of the hand.

A shut off valve (not shown) is another possible means of regulating the venting of the present invention. For an even longer auger, foot bar 30 (as described in FIG. 3A) may be connected into the series with neck 23 and handle 21. The longer length is beneficial for digging trenches for routing utility lines, extending the reach of pressure nozzle 60 to reach high places, and/or other possible uses.

Figure 8:
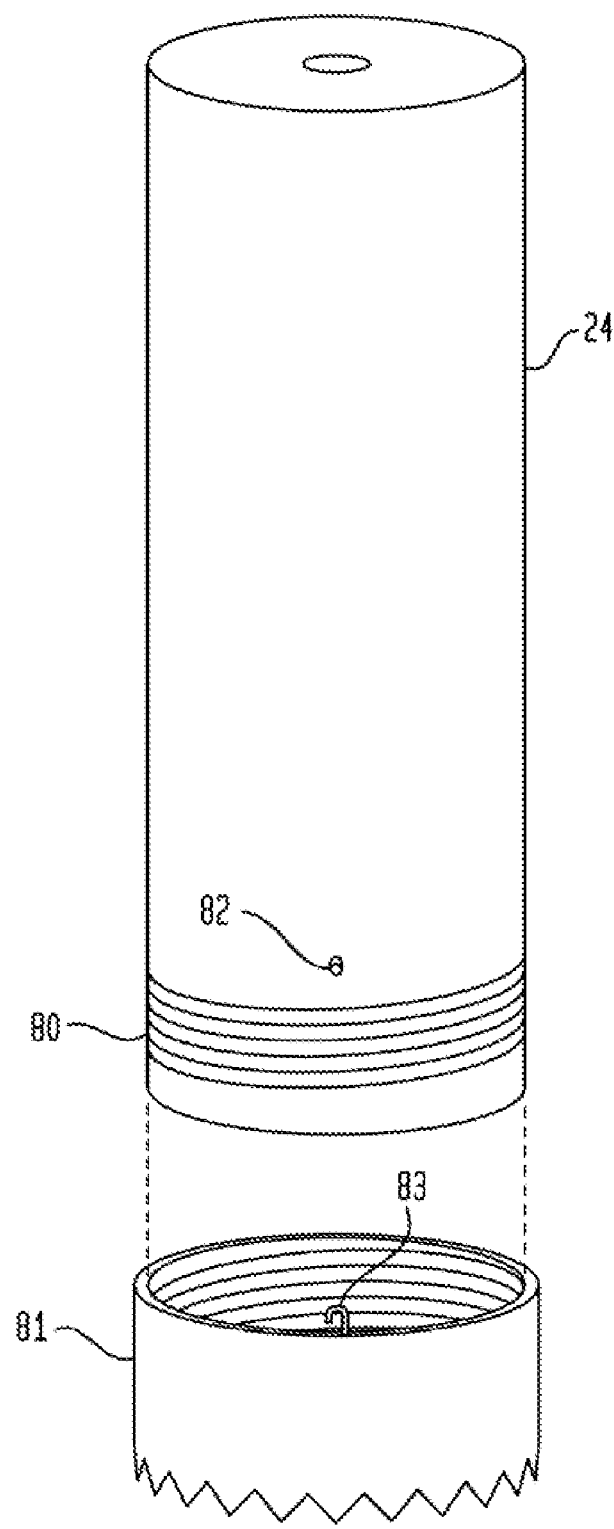
FIG. 8 is a perspective view of the side of the body, illustrating a connector with replaceable teeth, according to one embodiment of the present invention.

In yet another embodiment of the present invention, teeth 25 are designed to be replaceable when they get dull, broken, or alternatively, when different characteristics are needed for different substrates. FIG. 8 illustrates one possible means for replacing teeth 25 utilizing a screw on connector 81 for teeth 25 engaging with a complimentary connector 80 on body 24. One possible means for preventing the pieces from unscrewing during the rotation of the hole making tool of the present invention include a stud 82 on body 24 engaging with a locking tab 83 on teeth 25.

Figure 9:
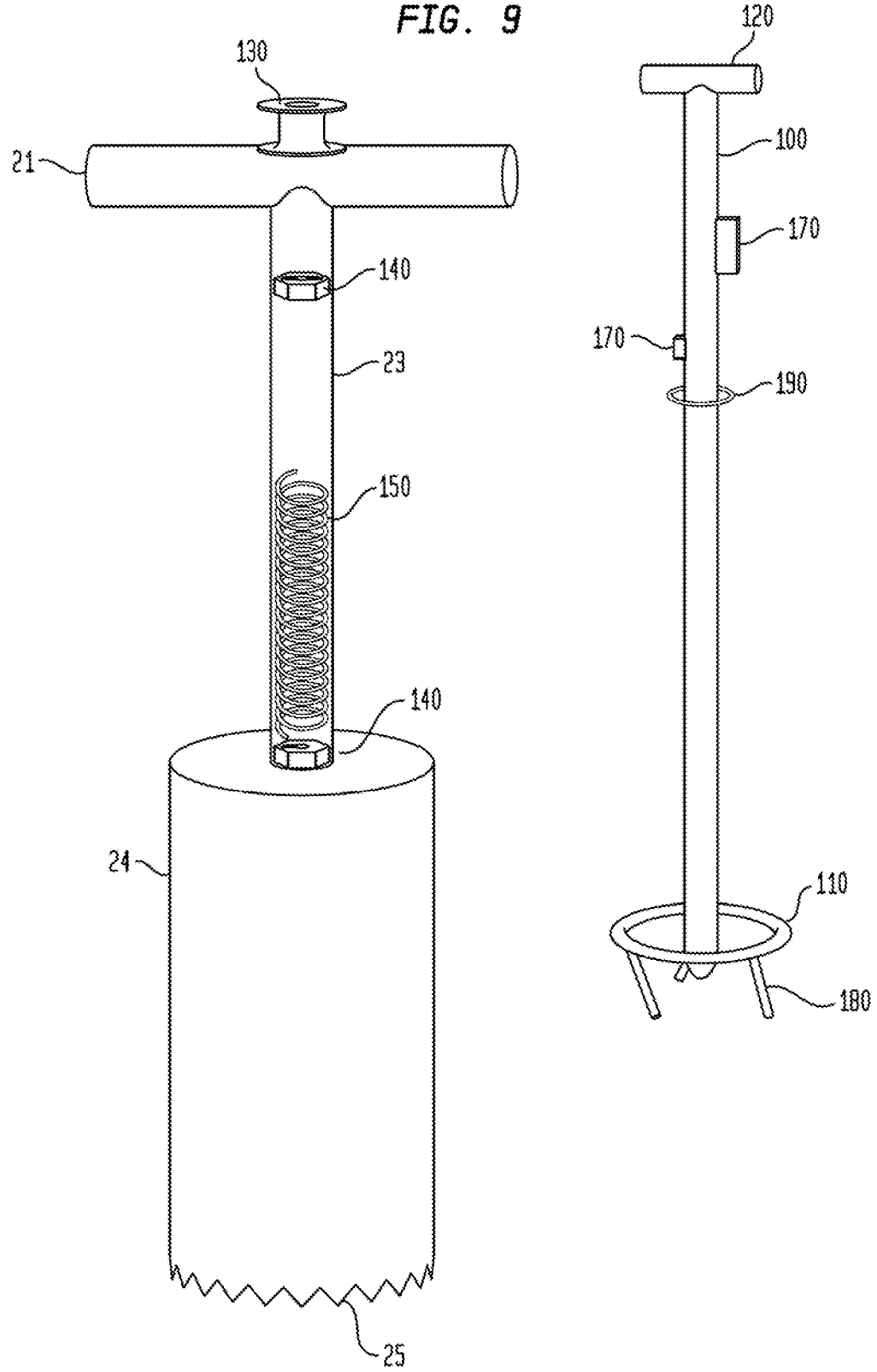
FIG. 9 is an exploded front view of the hole making tool of the present invention.
Figure 10:
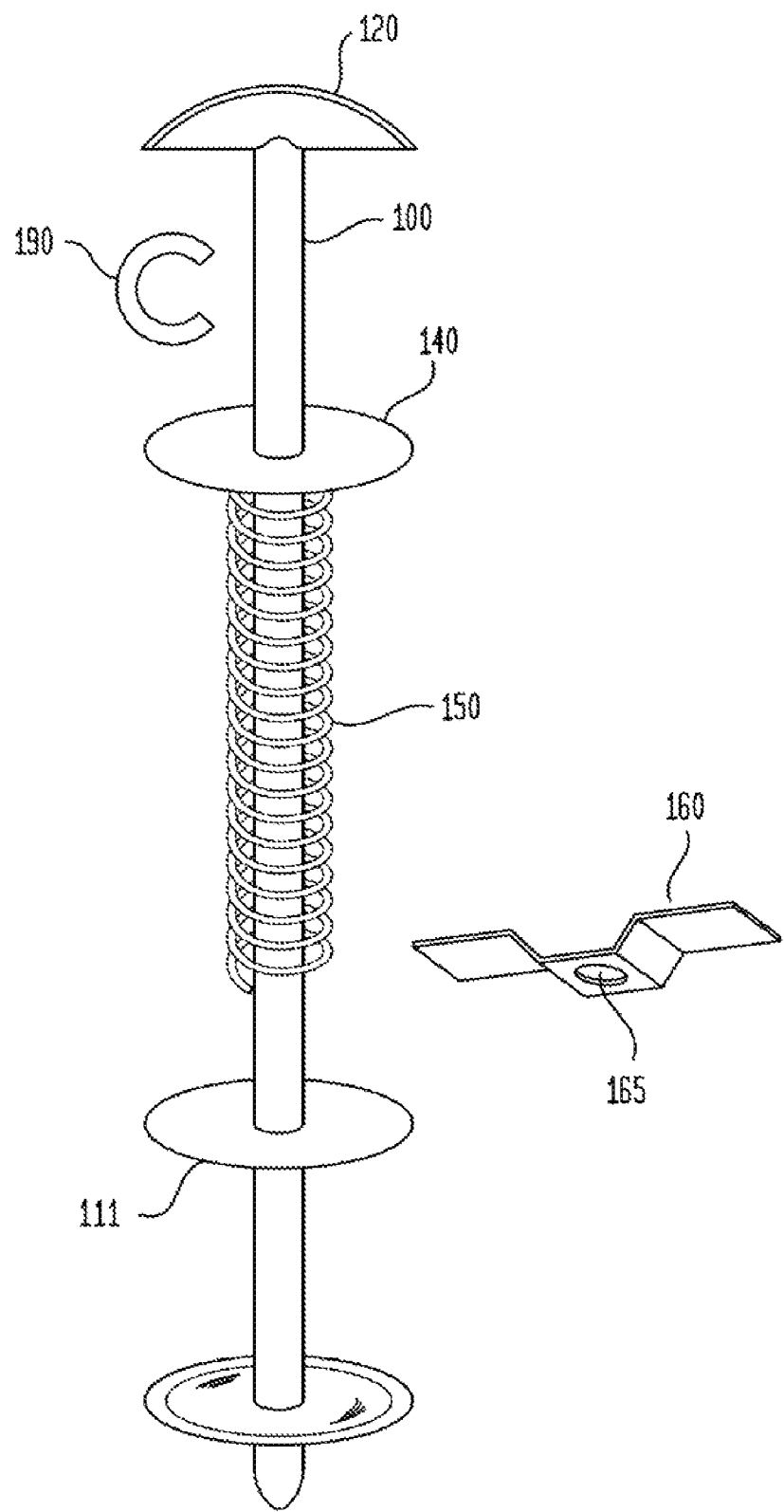
FIG. 10 is an internal view of the handle, illustrating the rod for moving substrate, spring means for moving the rod, and rod locking means.

Referring to FIGS. 9 and 10, passing through the center of the handle 21 and down into the body 24 is a rod 100. At the bottom of rod 100 is a plunger plate 110 for pushing out any substrate, such as soil which may be adhering to the inside of the body. At the top of the rod is a means to rotate the rod 120, such as a handle or a knob. A means to create an internal seal on the inside of the tool, such as a seal 111 around the plunger plate is a one means to increase suction and aid in keeping substrates such as sandy soil in the body. The seal may be composed of rubber, silicone or other material. The seal may be located on other locations within the tool such as on the rod to seal off the interior of the handle. When the rod is pulled upward while the body is in the substrate, and the vent hole covered, a suction is created. Similarly, allowing air in through the vent, then covering the vent while pushing down on the rod, will create a pressure to expel the plug contained in the body. This would be useful with sticky substrates such as clay soil. Alternative embodiments of the pushing means include plates, tines, and/or screws.

As seen in FIGS. 9 and 12, the seal and/or grommet 130 that covers the opening on handle 21 also allows rod 100 to travel up and down within handle 21 and seals the opening at handle 21 through which rod 100 travels thus maintaining suction when the vent hole is covered. Seal 130 may be made from rubber, plastic, and/or any other suitable material.

Also positioned within handle 21 and body 24 are means to center and stabilize the rod, but still allow rod 100 to move up and down. As shown in FIG. 9, one embodiment of this stabilizing means 140 is a pair of hex nuts. As shown in FIGS. 10 and 11, another embodiment of stabilizing means 140 is a slotted plate. Stabilizing means 140 is attached to the inside of handle 21 and body 24 by an adhesive, such as welding glue. Stabilizing means 140 is attached such that it still allows for the passage of air up through handle 21 to vent hole 22 and does not impede the suction required to make the present invention function.

A tensioning means for bringing the rod back up and keeping it out of the way after use is provided. Referring to FIGS. 9-11, one embodiment of such a tensioning means is a spring 150 that applies upward pressure on rod 100. The tension created by spring 150 is such that the upward pressure also permits rod 100 to be pushed downward to serve as a plunger when required.

In another embodiment of the present invention, shown in FIGS. 10 and 11, rod 100 has a locking means of maintaining the rod in the downward position so that the tines or other additional devices may function when required. One embodiment of this locking means is a bracket 160 with a key hole opening 165 that allows a tab 170 positioned on rod 100 to pass through opening 165. By rotating the handle 120 at the top of rod 100, tab 170 on rod 100 is rotated allowing tab 170 to lock into bracket 160 keeping rod 100 from moving upward until required. Additionally, the locking means keeps rod 100 from rotating so that the tines 180 may cultivate the substrate. Alternatively, as seen in FIGS. 9-11, the locking means may be a C-clip 190.

In another embodiment of the present invention, shown in FIG. 13 the teeth 25 are positioned at the bottom of the body 24 such that the opening is at an angle to the substrate. This positions the teeth 25 at various heights from the substrate. This also creates a shovel like aspect to the tool, such that when downward force is applied by a foot on the foot bar 30, the teeth 25a closest to the substrate, enter the substrate before the teeth 25b located higher up the body 24. This reduces the effort required to cut through the substrate. It also creates a scoop like opening. As discussed previously, the vent hole 22 may be positioned at a convenient location such as at the top of the handle 21, such that it can be covered with a thumb or finger to create suction when the handle is pulled upward, out of the substrate.

Figure 14:
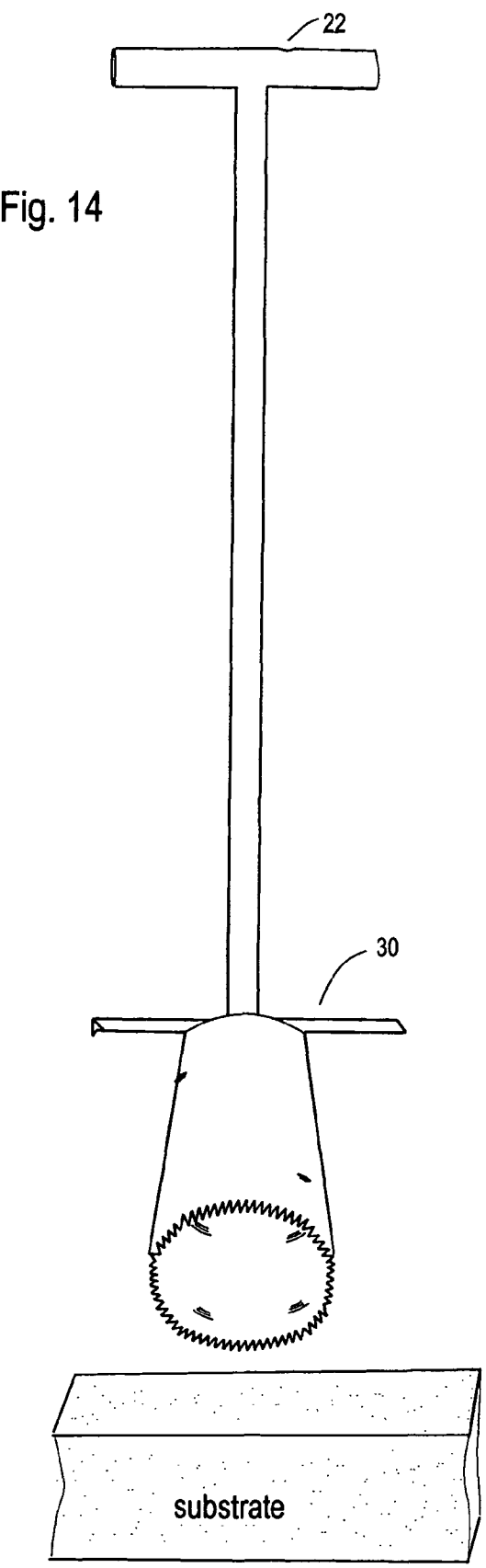
FIG. 14 is a perspective view of the hole making tool illustrating the handle, the body which is wider at the bottom than at the top, and upper and lower teeth.

In another embodiment of the present invention, the body 24 is narrower at the cap 27 and wider at the opening as illustrated in FIG. 14. The teeth may be positioned at an equal distance from the cap 27 as illustrated and described previously in FIGS. 2, 3 and 3a, or at different heights as illustrated in FIG. 14. This wider opening at the bottom allows the soil or substrate to empty easier as in the case of sticky clay soils.

Figure 15:
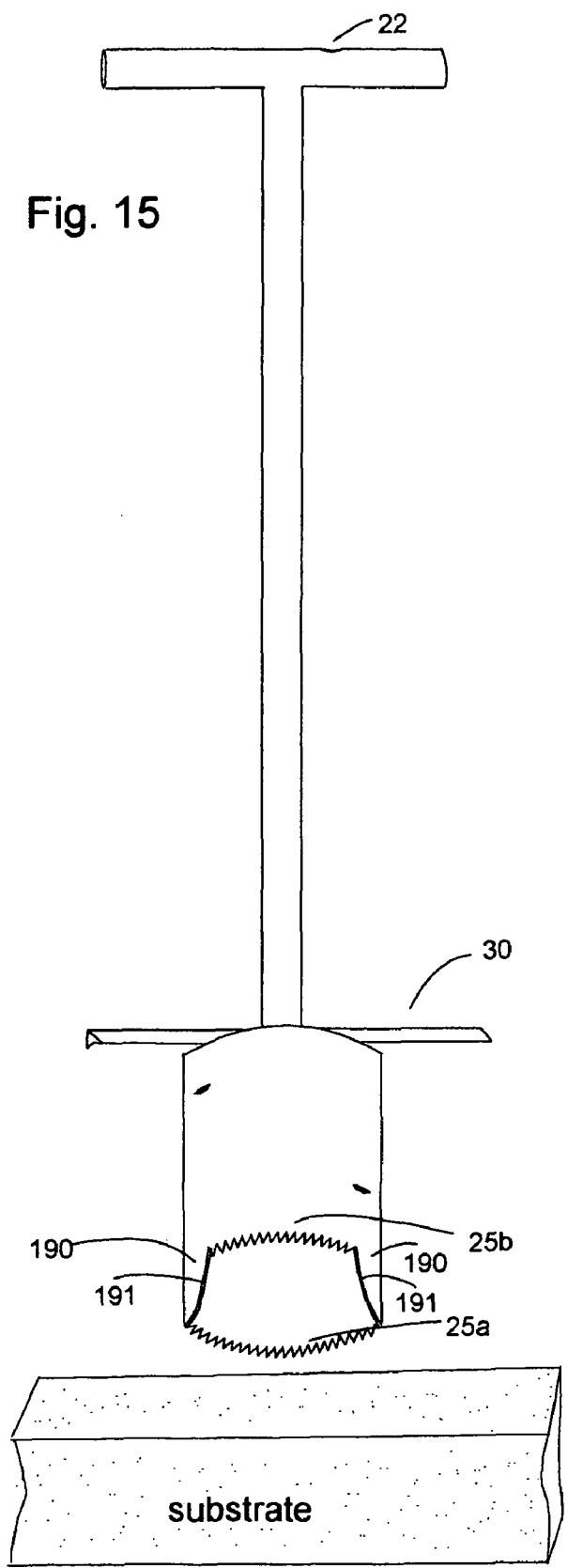
FIG. 15 is a perspective view of the hole making tool illustrating the handle, the body with sides at the opening which create a scoop, and upper and lower teeth.

In another embodiment of the present invention, shown in FIG. 15 the sides 201 of the body at the opening are raised such that more substrate can be retained than if the opening was more of an oval shape as shown in FIG. 13. The sides may or may not have teeth. A sharpened edge 202 at the sides 201 would aid in cutting through the substrate when the tool is rotated.

Figure 16:
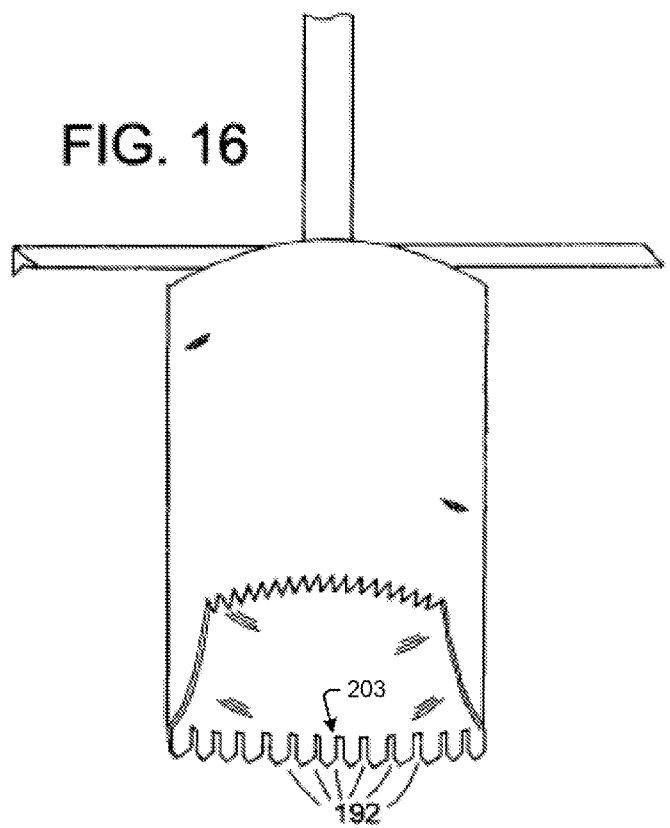
FIG. 16 is a perspective view of the bottom portion of the hole making tool illustrating slits alongside a plurality of teeth creating a rake like feature.

In another embodiment of the present invention, shown in FIG. 16 slits 203 create additional sides to the teeth. The spaces that these slits create, are useful to ensnare the roots of weeds. When the tool is pushed into the soil where the weed is growing and the handle is rotated, the rotation will remove the weed by the roots.

Figure 18:
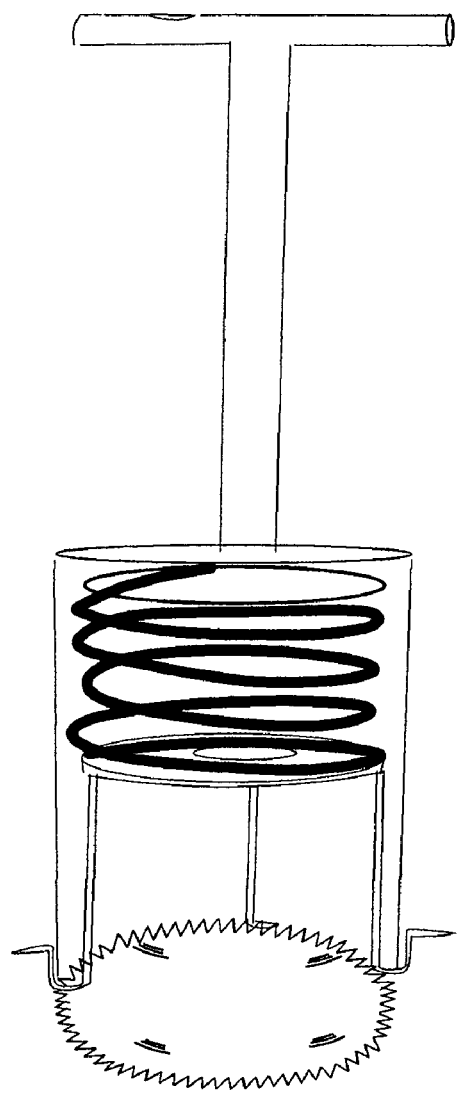
FIG. 18 is a cut away view of a multi-purpose scoop illustrating a foot pedal operated plunger system.

In another embodiment of the present invention as illustrated in FIG. 17 a foot pedal operated plunger plate system 300, a plunger plate 301 pushes substrate, such out of the body 24, when a foot applies downward pressure to the attached foot pedal 304. A spring 303, the bottom of which is attached to the plunger plate 301 by welds or other attaching means, and the top of spring 303, which is attached to the inside of the cap 27 by welds or other attaching means, is stretched when the foot pedal is pushed downward. Removing the foot from the foot pedal causes the stretched spring to return to its relaxed stated thus bringing up the foot pedal. Pulling the foot pedals 304 against the teeth 25 by the spring 303 in its relaxed stated is one means of holding the foot pedals in place when the tool is rotated in the substrate. Tabs 305 attached to the inside of the body 24 is one means of preventing the plunger plate 301 from moving downward further than desired and thus damaging the s over stretching FIG. 18 illustrates the foot operated plunger system 300 within the multi-purpose scoop.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A multi-purpose scoop comprising:
    a body having a top circumference and a bottom circumference, the bottom circumference spaced apart from the top circumference at a first distance along a back portion and at a second distance along a front portion, the first distance being longer than the second distance, the body having two sets of different teeth positioned along the bottom circumference, the first set of teeth along the front portion being triangular shaped, and the second set of teeth along the back portion having a triangular upper portion with a rectangular shaped spacer portion between each of the teeth and configured to ensnare roots of weeds;
    a cap attached to a top surface of the body;
    a handle, the handle having a vent positioned thereon for creating suction; and
    a neck positioned between the body and the handle, the neck being attached to an opening in the cap.

2. The multi-purpose scoop in claim 1 wherein the bottom opening of the body has a bottom edge, an upper edge and sides.

3. The multi-purpose scoop of claim 1 wherein the body is cylindrical in shape.

4. The multi-purpose scoop of claim 1 wherein the body further comprises a series of demarcations positioned on a front surface of the body.

5. The multi-purpose scoop of claim 1 further comprising a foot bar laterally attached to the cap of the body.

6. The multi-purpose scoop of claim 1 further comprising a threaded connector positioned equidistantly between a first end and a second end of the handle.

7. The multi-purpose scoop of claim 6 further comprising a shut off valve positioned on the threaded connector.

8. The multi-purpose scoop of claim 1 further comprising a pressure nozzle positioned at the junction of the neck and the body.

9. The multi-purpose scoop of claim 1 wherein the handle is removeably attached to the neck.

10. The multi-purpose scoop of claim 1 wherein the two sets of different teeth are removeably attached to the body.

11. The multi-purpose scoop of claim 1 wherein an opening in the handle is sealable.

12. A multi-purpose scoop of claim 1 further comprising:
a rod, the rod inserted through an opening positioned equidistantly between a first end and a second end of the handle;
the rod being positioned within a center portion of the neck and the body, the rod having a means for rotating the rod positioned at the top of the rod and a pushing means positioned at the bottom of the rod;
a stabilizing means for centering the rod, the stabilizing means being attached to an upper portion of the neck below the handle and the cap;
a tensioning means for applying pressure to the rod, the tensioning means being positioned around the rod; and
a locking means for maintaining the rod in a downward position.

13. The multi-purpose scoop claim 12 wherein the pushing means is selected from the group consisting of a plunger plate, tines, screws, and a combination thereof.

14. The multi-purpose scoop of claim 12 wherein the stabilizing means is selected from the group consisting of a pair of hex nuts, a pair of slotted plates, and a combination thereof.

15. The multi-purpose scoop of claim 12 wherein the tensioning means is a spring.

16. The multi-purpose scoop of claim 12 wherein the locking means is selected from the group consisting of a bracket and a tab positioned on the rod, a C-clip, and a combination thereof.

17. The multi-purpose scoop of claim 12 wherein the shape of the handle is selected from the group consisting of tubular, circular, and a combination thereof.

18. The multi-purpose scoop in claim 12 wherein further comprising a seal located on the rod assembly to increase suction when said rod is pulled upward while the body is in a substrate.

19. A multi-purpose scoop comprising:
a body, the body having a cap attached to a top surface of the body, the body having a top circumference and a bottom circumference, the bottom circumference spaced apart from the top circumference at a first distance along a back portion and at a second distance along a front portion, the first distance being longer than the second distance, the body having two sets of different teeth positioned along the bottom circumference, the first set of teeth along the front portion being triangular shaped, and the second set of teeth along the back portion having a triangular upper portion with a rectangular shaped spacer portion between each of the teeth and configured to ensnare roots of weeds;
a handle, the handle having a vent positioned thereon for creating suction;
a neck positioned between the body and the handle, the neck being attached to an opening in the cap;
a rod, the rod being inserted through an opening positioned equidistantly between a first end and a second end of the handle, the rod being positioned within a center portion of the neck and the body, the rod having a means for rotating the rod positioned at the top of the rod and a pushing means positioned at the bottom of the rod;
a seal on the rod having contact with the inner diameter of the tool creating an upper chamber and a lower chamber within the tool;
a stabilizing means for centering the rod, the stabilizing means being attached to an upper portion of the neck below the handle and the cap;
a tensioning means for applying pressure to the rod, the tensioning means being positioned around the rod; and
a locking means for maintaining the rod in a downward position.

* * * * *